United States Patent [19]
Inui et al.

[11] Patent Number: 5,581,538
[45] Date of Patent: Dec. 3, 1996

[54] RECORDING/REPRODUCING APPARATUS WITH A PROBE TO DETECT DATA RECORDED IN PITS AND PROJECTIONS OF A RECORDING MEDIUM

[75] Inventors: Tetsuya Inui, Nara; Hirotsugu Matoba, Sakurai; Susumu Hirata, Nara-ken; Yorishige Ishii, Yamatotakada; Kenji Ohta, Nara-ken, all of Japan

[73] Assignee: Sharp Kabushiki Kaisha, Osaka, Japan

[21] Appl. No.: 358,545

[22] Filed: Dec. 14, 1994

[30] Foreign Application Priority Data

Dec. 16, 1993 [JP] Japan ................................ 5-316124

[51] Int. Cl.⁶ .............................. G11B 9/00; H01L 21/66
[52] U.S. Cl. ........................ 369/126; 369/107; 250/306
[58] Field of Search .................................. 369/126, 107; 250/306, 307

[56] References Cited

U.S. PATENT DOCUMENTS

| | | | |
|---|---|---|---|
| 5,389,475 | 2/1995 | Yanagisawa et al. | 369/126 |
| 5,390,161 | 2/1995 | Kurihara et al. | 369/126 |
| 5,404,349 | 4/1995 | Nose et al. | 369/126 |
| 5,432,771 | 7/1995 | Shido et al. | 369/126 |
| 5,471,458 | 11/1995 | Oguchi et al. | 369/126 |

FOREIGN PATENT DOCUMENTS

| | | |
|---|---|---|
| 4-157644 | 5/1992 | Japan. |
| 4-206536 | 7/1992 | Japan. |
| 6-176410 | 6/1994 | Japan. |

OTHER PUBLICATIONS

Nikkei Microdevices, issued Jul. 1991 (the cover page, table, pp. 89–110).

*Primary Examiner*—Georgia Y. Epps
*Assistant Examiner*—Kim-Kwok Chu

[57] ABSTRACT

A probe is displaced relative to a recording medium according to a drive voltage. A chip is provided at an end of the probe. The chip serves to form pits and projections on a surface of the recording medium according to a recording voltage (Vp2) and serves to output a current signal responsive to the pits and projections with a reproducing voltage (Vp1) applied. A voltage generator generates the recording voltage and the reproducing voltage based on address and data signals. A sample-hold unit samples at a specified frequency a current signal obtained from a no-recording area of the recording medium by the chip and produces an output voltage signal. A reproducing unit demodulates and reproduces increment and decrement of the current signal obtained from a recording area of the recording medium by the chip. A control unit controls recording and reproduction. The control unit outputs such a drive voltage that the interval between the chip and the recording medium is maintained constant by feedback control based on the voltage signal derived from the sample-hold unit. The control unit controls the recording so that no-recording areas and recording areas are arranged alternately.

7 Claims, 3 Drawing Sheets

RECORDING/REPRODUCING APPARATUS WITH A PROBE TO DETECT DATA RECORDED IN PITS AND PROJECTIONS OF A RECORDING MEDIUM

BACKGROUND OF THE INVENTION

1. Field of the Invention

The present invention relates to a recording and reproducing apparatus for performing the recording process by forming microscopic pits and projections on a substrate surface with a recording voltage applied to a probe brought in proximity to the substrate surface, and for performing the reproduction process by detecting a current that flows according to the pits and projections through the probe brought in proximity to the substrate surface. The invention also relates to a high-density recording medium for the recording and reproducing apparatus.

2. Description of the Prior Art

Conventionally, the so-called STM (Scanning Tunnel Microscope), which detects the pits and projections of the surface by detecting a tunnel current developed when a microscopic probe is brought in close proximity to the substrate surface, has been used for fine evaluation of surface shape. In more recent years, further attempts have been made to implement the recording by forming pits and projections of the atomic order on the substrate surface by using the STM.

Generally, a conventional STM has the following arrangement. As shown in FIG. 5, piezoelectric elements 27, 28, 29 are arranged in a cylindrical shape, and a chip 31 is located at an end of an actuator 30 that will be displaced axially by drive voltages applied to those piezoelectric elements. The pits and projections of the surface are measured by detecting a tunnel current that will flow when the chip is brought in proximity to the surface of the recording medium.

In this arrangement, a large current, when flowed through the chip, allows microscopic crater-like pits to be made in the surface of the recording medium, whereby the recording can be accomplished. The recording can be done also by making use of variations in the magnetized state or dielectric constant of the recording medium or the like, not only by making crater-like pits. Detailed description of these aspects can be found in literatures (e.g., NIKKEI MICRODEVICES, July 1991, p. 89).

Japanese Patent Laid-open Publication No. 4-206536 describes an attempt to provide a recording apparatus using the principle of the STM. In this example, a structure having a plurality of chips arranged one by one is mounted on a piezoelectric element, and the chips are driven in a parallel fashion so that signal recording and reproduction is attained.

Japanese Patent Laid-Open Publication No. 4-157644 describes a method in which the STM chip is mounted on a floating type slider used for the recording on magnetic hard disks, whereby recording is enabled. Further, in Japanese Patent Laid-open Publication No. 6-176410, the present inventors have proposed a method of forming a slider and a cantilever integrally.

Currently, commonly known are two methods of detecting STM signals. One method is to do scanning in such a way that the STM signal current is maintained constant. More specifically, once an STM current is detected, the height of the chip is controlled by an actuator so that the current is kept constant. In doing this, pits-and-projections information of the recording medium surface is obtained from the drive voltage of the actuator. This method is widely used by virtue of its permitting a wide dynamic range of measurement.

The other method is to do scanning with the height of the chip maintained constant. That is, scanning is performed while the spacing between the chip and the recording medium surface is maintained constant. Then, pits-and-projections information of the surface is obtained from the magnitude of the STM current that results from the scanning.

The above two methods of detecting STM signals, when applied to a recording and reproducing apparatus using the STM, would give rise to the following problems.

Firstly, the two detection methods are both considerably weak to external vibrations, to a disadvantage. This is because, in either case of the methods, any vibration of the chip or the recording medium due to external vibration would be detected as pits-and-projections information as it is.

In the detection method in which the STM current is maintained constant, when the chip or recording medium vibrates due to external vibration, the piezoelectric element is driven in such a direction as to correct the vibration. The drive voltage of the actuator is recognized as pits-and-projections information and therefore erroneous pits-and-projections information is detected.

The case is the same also with the detection method in which the chip height is maintained constant. That is, if the chip vibrates with external vibration applied thereto, variations in the STM current due to this are detected directly as pits and projections. As a result, erroneous pits-and-projections information is detected also in this case.

Accordingly, there has hitherto been a need of installing the whole recording and reproducing apparatus on a vibration isolator so that external disturbance can be shielded to a maximum for prevention the possibilities of the above-mentioned misdetection. This need would inevitably cause the recording and reproducing apparatus to be a large-size, heavyweight, and expensive one as a whole.

As another problem, when recording is implemented by the detection method in which the STM current is maintained constant, the recording signal would give external disturbance to signals for use of driving the piezoelectric element. In more detail, for recording pits and projections, a large recording voltage is applied to the chip to make a flow of current. The current flowing in this process is greater than normal STM currents. Besides, since this current flows intermittently according to the pattern of the signal of pits and projections, a steady, weak STM current for maintaining constant a spacing between probe and sample cannot not be detected while the recording is being performed. Therefore, it is difficult to maintain constant the spacing between chip and recording medium.

For the reproducing process, in areas in which pits and projections are recorded, there arise variations in the STM current due to the pits and projections. In the case of the method in which the STM current is maintained constant, it is necessary to drive the chip vertically after the pits and projections that cause the variations in the STM current. However, if a signal is to be recorded at a very high density and reproduced at high speed, the frequency of the reproducing signal would reach the order of a few MHz to a few GHz so that the chip could hardly be made to track this frequency.

In the case of the method in which the chip height is constant, it is only required to detect variations in the STM current, in which case high speed reproduction is relatively easy to accomplish. However, in this case, the STM current could not be detected unless the chip height is within a specific range of, for example, 10 nm or less. Therefore, there is a limitation to such areas that the spacing between chip and recording medium falls within a specific range, disadvantageously.

SUMMARY OF THE INVENTION

The present invention has been developed with a view to substantially solving the above described disadvantages and has for its essential object to provide a recording and reproducing apparatus which is resistant to external vibration and which can record and reproduce data on a recording medium with correctness and at high density, by eliminating interference between a data-oriented current signal flowing through the chip according to pits and projections of the surface of the recording medium in recording and reproducing processes, and a tunnel current flowing through the chip according to the flat surface of the recording medium and used for driving the actuator so that the chip height is maintained constant. Another object of the present invention is to provide a highdensity recording medium on which data is recorded at high density by such a recording method that the aforementioned interference can be eliminated.

In order to achieve the aforementioned object, the present inventors directed their attention to the point that the data-oriented current signal and the tunnel current do not interfere with each other, when recording areas for data are separated from areas for tunnel current on the recording medium. From this point of view, present inventors made this invention by devising components of the apparatus so as to enable the separation of the areas.

Namely, the first aspect of the present invention provides a recording and reproducing apparatus comprising:

an actuator (6) which will be displaced in a direction vertical to a surface of a recording medium (8) according to a drive voltage applied;

a chip (7) provided on the actuator so as to be opposed to the recording medium (8) with a spacing thereto, the chip serving for forming pits and projections on the surface of the recording medium according to a recording voltage (Vp2) applied and for outputting a current signal according to the pits and projections of the surface of the recording medium when a reproducing voltage (Vp1) is applied;

a voltage generator (11, 12, 14, 15, 18, 25) for generating the recording voltage (Vp2) from an address signal and a data signal to be recorded, and generating the reproducing voltage (Vp1) and for outputting the voltages to the chip (7);

a sample-hold means (13, 17, 20, 21, 24) for sampling at a specified frequency a current signal (Ip1) outputted from the chip (7) in correspondence to the no-recording areas (9) of the recording medium (8) and for outputting a voltage signal equivalent to a tunnel current;

a reproducing unit (16) for demodulating increment and decrement of the current signal (Ip2) outputted from the chip (7) in correspondence to the recording areas (10) of the recording medium (8) to output a reproducing signal; and a control unit (22) for, in recording, making the voltage generator output the reproducing voltage (Vp1) and the recording voltage (Vp2) alternately to the chip (7) so that the no-recording areas (9) without pits and projections and recording areas (10) with pits and projections are alternately arranged side by side in a recording direction on the surface of the recording medium (8), thereby accomplishing recording, and moreover applying a drive voltage of such a level that the tunnel current becomes a constant value corresponding to the constant spacing between the chip and the recording medium surface, to the actuator (6) based on the voltage signal of the no-recording areas (9) outputted from the sample-hold means, and for, in reproduction, making the voltage generator 10 output the reproducing voltage (Vp1) to the chip (7) and moreover applying a drive voltage of such a level that the tunnel current becomes the constant value, to the actuator (6) based on the voltage signal of the no-recording areas (9) outputted from the sample-hold means and furthermore activating the reproducing unit (16).

In the apparatus for recording and reproducing with the above-described arrangement, since the spacing between chip and recording medium is controlled on the average to a certain fixed quantity, the recording and reproducing apparatus is completely insulated from external vibrations, becoming resistant to vibrations. The chip on the actuator, held as it is by a drive voltage according to a sampled STM current between a no-recording area and its succeeding no-recording area, can be made free from any effect of vibrations by arranging the interval between the two no-recording areas to be a sufficiently short one. Also, if the probe is provided by a cantilever and the cantilever is made extremely short, its resonance frequency becomes so large that the probe will be less affected by external vibrations.

Further, since a data signal is obtained by detecting a STM current under the condition that the spacing between the chip and the recording medium is constant, high speed detection can be implemented, so that 10 the probe no longer needs to be moved at high speed as much as when the signal is detected under a condition that the STM current is constant.

Further, the second aspect of the present invention provides a high-density recording medium for recording information thereon by forming pits and projections on its surface with a probe (6), wherein no-recording areas (9) without pits and projections and recording areas (10) with pits and projections are alternately arranged side by side on the surface of the high-density recording medium (8) in a recording direction of the probe (6).

On the above-described recording medium, the recording manner of which can be realized by the apparatus, the area for an information signal and the area for sampling a chip drive signal are separated from each other; accordingly the two signals will not interfere with each other. Therefore, the control system and the signal detection system becomes stable. As a result, it becomes a reality to form fine pits and projections of the magnitude on the atomic order on the surface of the recording medium and to reproduce the pits and projections information as a signal, with stability. It is now feasible to offer an information recording medium with extremely large capacity.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail by way of embodiments thereof as illustrated in the accompanying drawings.

Figure 1:
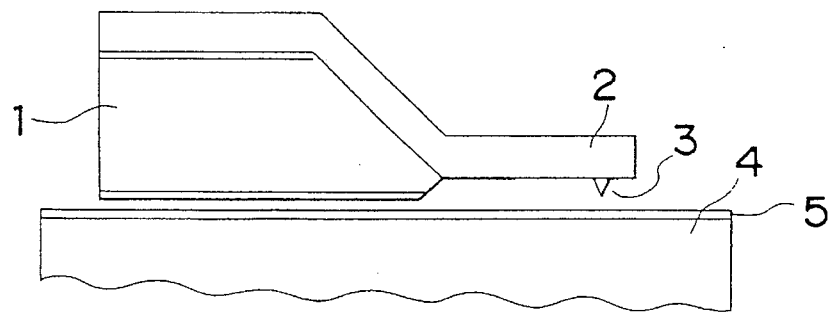
FIG. 1 is an arrangement view of a slider and a cantilever, as an example of the actuator and chip according to the present invention.

Referring to FIG. 1, reference numeral 1 denotes a slider which is made from a silicon single crystal and which serves as an actuator that will be displaced vertically by a drive voltage applied thereto. A cantilever 2 is mounted at the top end of the slider 1. A chip 3 is formed at the tip of the cantilever 2 so as to be opposed to a recording medium 5 on a substrate 4 with a slight clearance. When a recording voltage is applied to the chip 3, pits and projections are formed on the surface of the recording medium 5 according to the voltage, whereby recording is effected. When a reproducing voltage is applied to the chip 3, a current according to the pits and projections of the surface of the recording medium 5 flows through the chip 3, whereby reproduction is effected.

The substrate 4 may be made of Al or its alloys, glass, or ceramics. The surface of the substrate 4 needs to have been finished to an extremely smooth surface in view of the smallness of recording bits and the recording and reproduction of signals by STM. Therefore, in connection to the aforementioned substrate materials, it is allowed to use, for example, EEM (Elastic Emission Machining), in which a rotating polyurethane ball is pressed against the substrate surface in aqueous solution containing an abrasive material so that a flow of fluid and abrasive material is formed between the polyurethane ball and the substrate, where the flow of the abrasive material polishes the surface. Using such a method makes it possible to finish the processed surface to a surface roughness on the order of a few nm or less.

In the present case, the surface of the substrate should be finished to a surface roughness of about 10 nm or less, more desirably to that of 1 nm or less.

The recording medium 5 may be made of a metal thin film, a semiconductor thin film, an amorphous thin film, or a magnetic material thin film.

In particular, using a carbon thin film as the recording medium S makes it possible to obtain a successful recording film. This can be attributed to the fact that the surface of the carbon thin film is stable and will not be oxidized. Also, even if it is oxidized, the resultant oxide will be formed into $CO_2$ or CO, leaving off the surface, so that it will not form an oxide layer on the surface. Further, the carbon thin film has electrical conductivity so that it is advantageous in making a flow of STM current on the surface. Metal thin films, although having electrical conductivity, tend to cause the surface to be oxidized in many cases. So with the use of a metal thin film, there are many cases where the surface is easily oxidized to form an oxide coating, especially from the atomic order's point of view. Insulating materials such as oxides (SiO, $SiO_2$, $Al_2O_3$) and nitrides (AlN, SiN, TiN), although being stable at their surfaces, have no electrical conductivity so that they are unsuitable for making use of STM signals.

A carbon thin film as the recording medium 5 can be formed in the following way. First, a substrate of quartz, glass, ceramics, or the like is polished in the above-mentioned way so that the surface roughness is reduced to the atomic order. In this process, the surface is required only to be reduced in roughness, but not to be corrected for flatness, because undulations with long wave length will be tracked by the probe in a way described later. Desirably, the surface roughness is finished to 1 nm or less, preferably to 0.1 nm or less.

Next, a carbon thin film is formed on the surface by evaporation or sputtering. For this process, such a method may be used that recording is effected up to the bottom of the carbon thin film with a flow of large current by means of the STM recording. In this case, the thickness of the carbon thin film is desirably 1 nm or less.

It is also possible to use another method that bits are formed only on the Surface layer of the carbon thin film without making a flow of so large a current to do recording. In such a case, the thickness of the carbon thin film may be thicker than 1 nm, for example, 10 nm.

Next, the surface of the carbon thin film is polished once again. This is to rectify the surface that has been roughed over evaporation or sputtering. This process is unnecessary in some cases, but reducing the surface roughness by polishing makes it possible to obtain a more successful signal quality.

Figure 2:
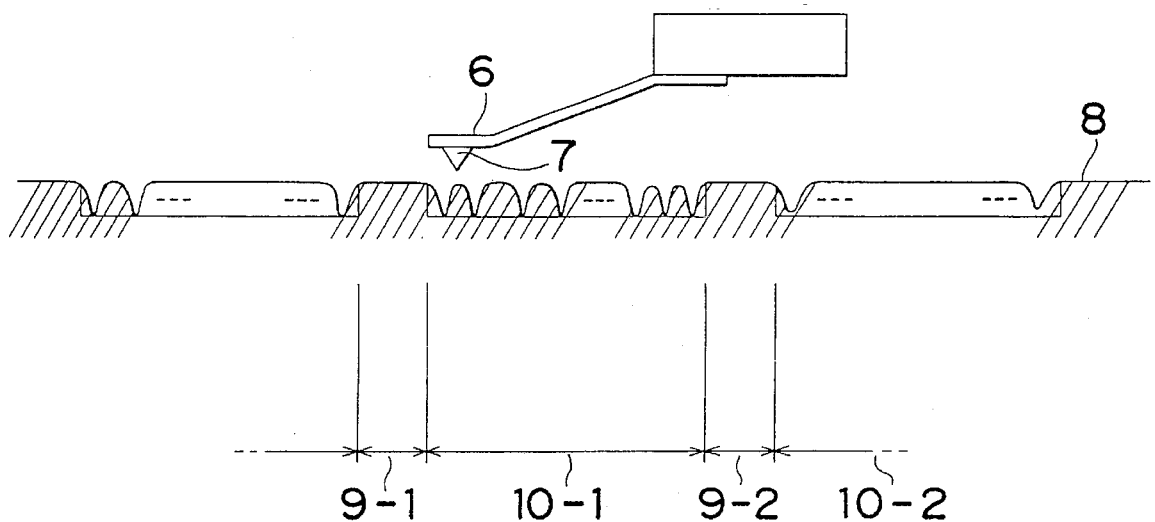
FIG. 2 is a view showing an example of the structure of recording areas of the high-density recording medium according to the present invention.
Figure 5:
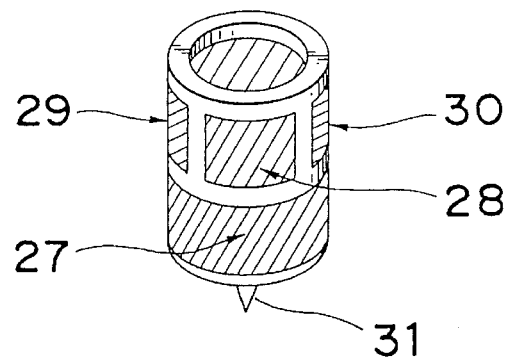
FIG. 5 is a view showing a conventional STM apparatus.

FIG. 2 shows an example of the structure of recording areas of the high-density recording medium according to the present invention.

A chip 7 is provided at the tip of a probe 6 serving as an actuator, and recording is effected by the chip 7. The surface of the recording medium 8 is classified into two types of areas, areas 9 having no pits or projections and areas 10 having pits and projections. The areas 9 are no-recording areas where the STM recording is not performed, while the areas 10 are areas where the recording is performed. On the surface of the recording medium 8, these two types of areas are alternately arranged side by side in the recording direction. Recording is not effected on the no-recording areas 9, but the STM current is detected in these areas. On the recording areas 10, for example, video signals or address information of the video signals are recorded.

Since the no-recording areas 9 are arranged so as to be alternated with the recording areas 10, the STM current detected from the no-recording areas 9 results in discrete values. The STM current is sampled and held, and made to pass a low-pass filter, as will be described later, whereby a signal equivalent to a continuous STM current can be obtained. Then, the probe 6 is driven by a piezoelectric element (not shown) so that the resulting signal is kept constant. Thus, the chip 7 can be controlled so as to be always kept at a constant spacing from the recording medium 8.

The interval between a no-recording area 9-1 and its succeeding no-recording area 9-2 is determined depending on the characteristics of the undulation of the recording medium 8. That is, the interval between the no-recording area 9-1 and the no-recording area 9-2 is determined so that the vertical undulation (variation range) of the recording medium 8 that takes place over a range from the no-recording area 9-1 to the no-recording area 9-2 falls within such a range that the chip 7 can correctly detect the STM current. In the substrate, generally, there exist undulations as viewed over a large range, whereas the undulation is small as viewed over a small range such that the undulation will be suppressed very small if the surface is finished to a surface roughness of 1 nm or less as described before. Accordingly, even if the STM current is detected in a discrete manner from only no-recording areas, the probe can be controlled by setting a sampling frequency greater than the spatial frequency band of the undulation (variation) of the substrate.

Figure 3:
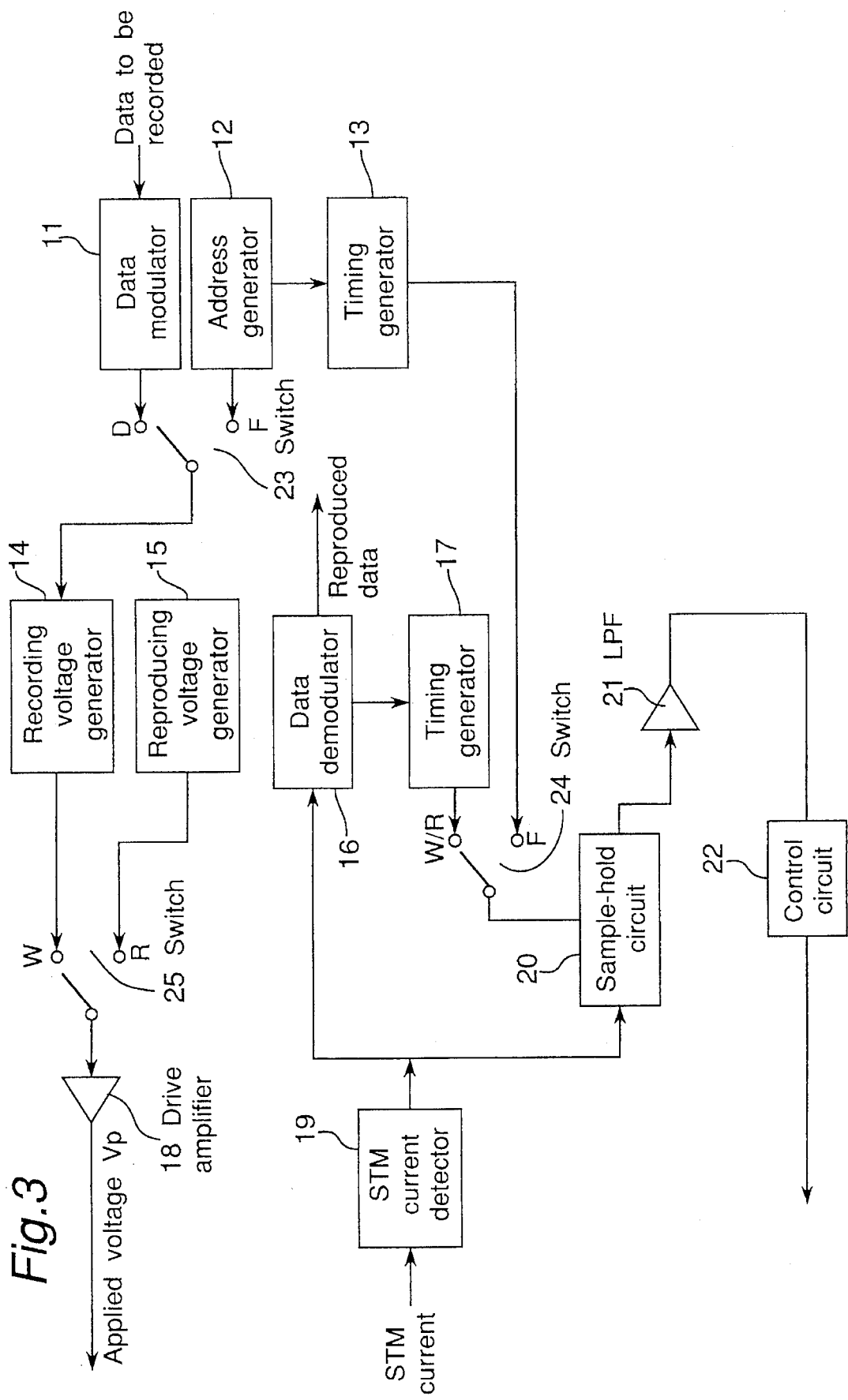
FIG. 3 is a block diagram showing an example of the recording and reproducing apparatus according to the present invention.

FIG. 3 is a diagram of an example of the recording and reproducing apparatus according to the present invention.

Figure 4:
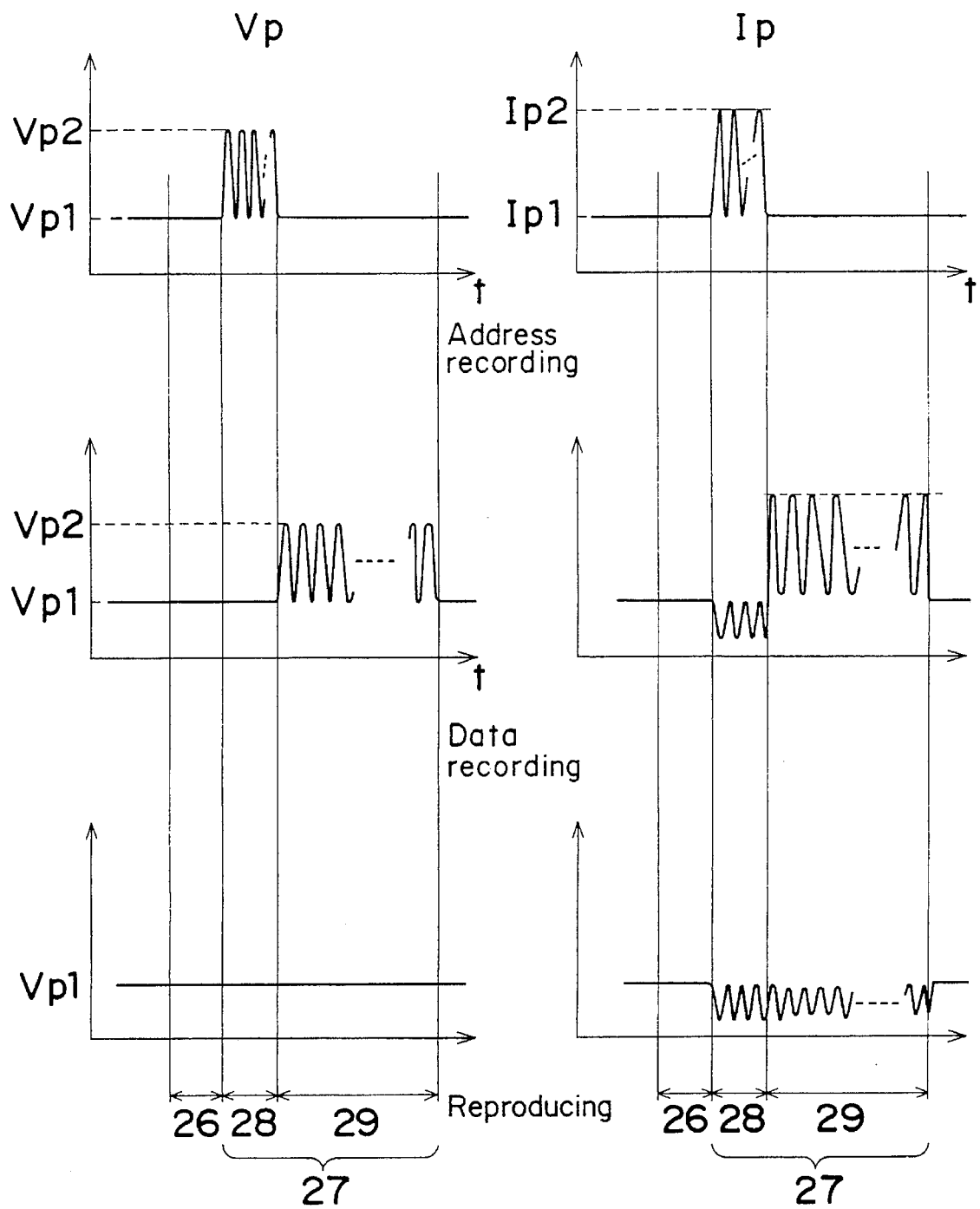
FIG. 4 is a signal waveform diagram in recording and reproducing processes by the recording and reproducing apparatus of FIG. 3.

FIG. 4 shows recording and reproducing voltages Vp applied to the chip 7, and a current Ip flowing through the chip 7 in recording and reproduction processes.

To record information on the recording medium, it is necessary to record (format) an address signal of the information prior to the recording process. Therefore, a control circuit 22 serving as a control unit makes an address signal generator 12 of FIG. 3 generate an address signal, and changes over a switch 23, thereby making the address signal fed to a recording voltage generator 14. The recording voltage Vp is applied to the chip 7 (see FIG. 2) by a drive amplifier 18 via a switch 25. In addition, a voltage generator is made up by the address generator 12, the switch 23, the recording voltage generator 14, the switch 25, the drive amplifier 18, and a data modulator 11 and a reproducing voltage generator 15, which will be described later.

Sampling timing for the STM signal (tunnel current) outputted from an STM current detector 19 during the recording process is generated by a timing generator 13 synchronously with the address generator 12. The sampling timing is fed to a sample-hold circuit 20 via a switch 24. Sampling is performed by the sample-hold circuit 20 based on the sampling timing. A voltage signal as a result of the sampling, passing through a low-pass filter 21, is entered into the control circuit 22, and applied as a drive voltage to the piezoelectric element (not shown) of the probe 6 (see FIG. 2), which is an actuator, by the control circuit 22. Sampled by such sampling is, actually, not a large current Ip2, which is shown in "address recording" of FIG. 4 but a small current Ip1 corresponding to the tunnel current. The piezoelectric element is driven based on the sampled current. In addition, a sample-hold means is made up from the timing generator 13, the switch 24, the sample-hold circuit 20, the low-pass filter 21, and a timing generator 17 which will be described later.

Waveforms of the recording voltage Vp in recording an address signal and the then resulting STM current Ip can be shown in "address recording" of FIG. The address signal is recorded at an address part 28 of a recording area 27. In this process, the recording voltage Vp at the address part 28 is modulated into, for example, a digital signal according to the address signal, at a level between the level of Vp2 and another lower than that. In this case, the lower level is given by Vp1 in FIG. 4 for convenience, but may be by another level. At the address recording part 28, a large STM current Ip2 according to the recording signal will flow in the process of recording. At every past except the address recording part 28, the applied voltage Vp is maintained at the level Vp1 at which a normal STM signal can be obtained. Besides, the STM current for driving the probe can be given by the current Ip1 sampled at a no-recording area 26 as stated before.

The control circuit 22 serving as a control unit subtracts the voltage signal of the no-recording area 9 (see FIG. 2) derived from the current Ip1 and inputted through the sample-hold circuit 20 and the low-pass filter 21, from a previously given reference voltage signal corresponding to the tunnel current resulting when the spacing between the chip and the recording medium surface is at an optimum, and outputs a subtraction-result signal to the piezoelectric element of the probe 6 through a built-in differential amplifier, a phase compensation circuit, and a gain control circuit, thus holding the spacing between the chip 7 and the recording medium 8 to the aforementioned optimum spacing by feedback control. It is noted that this feedback control by the control circuit 22 is performed similarly also in the processes of data recording and reproduction which will be described later. Thus, an address signal is recorded on the recording medium.

Subsequently, an information signal is recorded in the following way. That is, the control circuit 22 inputs an information signal to be recorded, to the data modulator 11 of FIG. 3, and changes over the switch 23, making the information signal fed to the recording voltage generator 14. The recording voltage Vp is applied to the chip 7 (see FIG. 2) by the drive amplifier 18 via the switch 25.

As for sampling timing for the STM signal during the recording process, a signal from the STM current detector 19 is fed to a data demodulator 16, an address signal is demodulated, the demodulated signal is fed to the timing generator 17. Then, a timing signal generated in the timing generator 17 based on the address signal is fed to the sample-hold circuit 20 via the switch 24. Sampling is performed by the sample-hold circuit 20 according to the timing signal. A sampled voltage signal, passed through the low-pass filter 21, is entered into the control circuit 22, and applied as a drive voltage to the piezoelectric element of the probe 6. Sampled by such sampling is, actually, not a large current Ip2, which is shown in "data recording" of FIG. 4 but a small current Ip1 corresponding to the tunnel current. The piezoelectric element is driven based on the sampled current.

Waveforms of the recording voltage Vp in recording a data signal and the then resulting STM current Ip can be shown in "data recording" of FIG. 4. The data signal is recorded at a data recording part 29 of the recording area 27. In this process, the recording voltage Vp at the data recording part 29 is modulated into, for example, a digital signal according to the data signal, at a level between the level of Vp2 and another lower than that. In this case, the lower level is given by Vp1 in FIG. 4 for convenience, but may be by another level. At the data recording part 29, a large STM current Ip2 according to the recording signal will flow in the process of recording. At every part except the data recording part 29, the applied voltage Vp is maintained at the level Vp1 at which a normal STM signal can be obtained. Besides, the STM current for driving the probe can be given by the current Ip1 sampled at the no-recording area 26 as stated before. Then, the control circuit 22 controls the spacing between the chip 7 and the recording medium 8 to an optimum value by the previously-stated feedback control using a voltage signal corresponding to the current Ip1 inputted via the sample-hold circuit 20 and the low-pass filter 21. Meanwhile, the address signal is obtained through the process that the data demodulator 16 serving as a reproducing unit demodulates increment and decrement of the STM current Ip derived from the address recording part 28 and outputs a reproduced signal. Thus, the data signal is recorded on the recording medium.

In addition, the control circuit 22 serving as a control unit makes the voltage generator, which includes the recording voltage generator 14 and the reproducing voltage generator 15, output a reproducing voltage Vp1 and a recording voltage Vp2 alternately to the chip 7 in the process of recording. Thus, the recording is accomplished in such a way that no-recording areas 9 having no pits or projections and recording areas 10 having pits and projections are alternately arranged in the recording direction on the surface of the recording medium 8 as shown in FIG. 2.

The recorded data is reproduced in the following way. The control circuit 22 makes a reproducing voltage, which has been generated by the reproducing voltage generator 15, fed to the drive amplifier 18 via the switch 25. The reproducing voltage normally exhibits a constant value Vp1 over the entire range, as shown in "reproducing" of FIG. 4. As for sampling timing for the STM signal during the reproducing process, a signal from the STM current detector 19 is fed to the data demodulator 16, the address signal is demodulated, and the demodulated signal is fed to the timing generator 17. A timing signal generated in the timing generator 17 based on the address signal is fed to the sample-hold circuit 20 via the switch 24. Sampling is performed with this timing signal by the sample-hold circuit 20. The sampled voltage signal, passed through the low-pass filter 21, is entered to the control circuit 22, and applied as a drive voltage to the piezoelectric element of the probe.

Waveforms of the reproducing voltage Vp in reproducing a data signal and the then resulting STM current Ip can be shown in "reproducing" of FIG. 4. The STM current for driving the probe is obtained by the current Ip1 sampled at the no-recording area 26. The address signal is obtained through the process that the data demodulator 16 demodulates increment and decrement of the STM current Ip derived from the address recording part 28 and outputs a reproduced signal. Besides, the data signal is also obtained through the process that the data demodulator demodulates the increment and decrement of the STM current Ip derived from the data recording part 29 and outputs a reproduced signal. Thus, the data signal is reproduced from the recording medium.

In addition, since during the processes of data recording and reproduction the timing signal for sampling the STM current is generated from a reproduced address signal, sampling could not be done unless the address is reproduced and therefore the address reproduction could not be done as far as sampling cannot be done, contradictorily. Accordingly, although not shown in FIG. 3, it is proper that the probe 6 is first approached to the recording medium 8 to roughly detect an address signal so that a timing is generated. To do this, it is desirable to adopt a high-redundancy modulation method so that the address signal can be detected even if the reproducing signal is poor in quality.

The above embodiment has been described on a method of recording and reproducing a signal, by way of example, in which pits and projections are formed on the surface of the recording medium and a signal is recorded and reproduced by using the tunnel current. However, the principle of recording and reproduction is not limited to this, but the present invention may be applied to methods of recording and reproducing a signal using other principles.

For example, the present invention may be applied to AFM (Atomic Force Microscope) using interatomic force, MFM (Magnetic Force Microscope) using magnetic force, and the like, similarly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high-density recording medium for recording information thereon by forming pits and projections on its surface with a probe, wherein no-recording areas without pits and projections, the no-recording areas for detecting tunnel current and recording areas with pits and projections are alternately arranged side by side on the surface of the high-density recording medium in a recording direction of the probe.

2. The high-density recording medium as claimed in claim 1, wherein the recording areas are for obtaining reproducing signals.

3. The high-density recording medium as claimed in claim 2, wherein the recording medium is for a scanning tunnel microscope.

4. A recording and reproducing apparatus comprising:

an actuator which will be displaced in a direction vertical to a surface of a recording medium according to an actuator drive voltage applied;

a chip provided on the actuator so as to be opposed to the recording medium with a spacing thereto, the chip serving for forming pits and projections on the surface of the recording medium according to a recording voltage (Vp2) applied and for outputting a current signal according to the pits and projections of the surface of the recording medium when a reproducing voltage (Vp1) is applied;

a voltage generator for generating the recording voltage (Vp2) from an address signal and a data signal to be recorded, and generating the reproducing voltage (Vp1) and for outputting the voltages to the chip;

a sample-hold means for sampling at a specified frequency a current signal (Ip1) outputted from the chip in correspondence to the no-recording areas of the recording medium and for outputting a voltage signal equivalent to a tunnel current;

a reproducing unit for demodulating increment and decrement of the current signal (Ip2) outputted from the chip in correspondence to the recording areas of the recording medium to output a reproducing signal; and a control unit for, in recording, making the voltage generator output the reproducing voltage (Vp1) and the recording voltage (Vp2) alternately to the chip so that the no-recording areas without pits and projections and the recording areas with pits and projections are alternately arranged side by side in a recording direction on the surface of the recording medium, thereby accomplishing recording, and moreover applying a drive voltage of such a level that the tunnel current becomes a constant value corresponding to the constant spacing between the chip and the recording medium surface, to the actuator based on the voltage signal of the no-recording areas outputted from the sample-hold means, and for, in reproduction, making the voltage generator output the reproducing voltage (Vp1) to the chip and moreover applying the drive voltage of such a level that the tunnel current becomes the constant value, to the actuator based on the voltage signal of the no-recording areas outputted from the sample-hold means and furthermore activating the reproducing unit.

5. The recording and reproducing apparatus as claimed in claim 4, wherein the sampling by the sample-hold means is performed according to a timing generated based on the address signal, which is reproduced from the recording areas of the recording medium by the reproducing unit.

6. A recording and reproducing apparatus as claimed in claim 4, wherein the control unit determines intervals between neighboring no-recording areas on the recording medium so that variation of the recording areas sandwiched by the no-recording areas in a direction vertical to the surface while recording is not yet performed falls within such a range that the chip can correctly detect the tunnel current.

7. The recording and reproducing apparatus as claimed in claim 4, wherein the sampling frequency of the sample-hold means is larger than a spatial frequency band of the variation in the direction vertical to the unrecorded surface of the recording medium.

* * * * *